(12) United States Patent
Choi et al.

(10) Patent No.: US 10,855,891 B2
(45) Date of Patent: Dec. 1, 2020

(54) APPARATUS FOR CONTROLLING POSITION OF CAMERA MODULE

(71) Applicant: SAMSUNG ELECTRO-MECHANICS CO., LTD., Suwon-si (KR)

(72) Inventors: Woo Young Choi, Suwon-si (KR); Sang Hoon Kim, Chuncheon-si (KR); Joo Yul Ko, Suwon-si (KR); Joo Hyoung Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 110 days.

(21) Appl. No.: 15/725,532

(22) Filed: Oct. 5, 2017

(65) Prior Publication Data
US 2018/0146124 A1  May 24, 2018

(30) Foreign Application Priority Data

Nov. 21, 2016 (KR) .................. 10-2016-0154705
Feb. 10, 2017 (KR) .................. 10-2017-0018737
Apr. 3, 2017 (KR) .................. 10-2017-0043151

(51) Int. Cl.
*H04N 5/232* (2006.01)
*H04N 5/225* (2006.01)

(52) U.S. Cl.
CPC ......... *H04N 5/2254* (2013.01); *H04N 5/2252* (2013.01); *H04N 5/23212* (2013.01); *H04N 5/23241* (2013.01); *H04N 5/23258* (2013.01)

(58) Field of Classification Search
CPC .................. H04N 5/23248; H04N 5/23258
(Continued)

(56) References Cited

U.S. PATENT DOCUMENTS 5,055,784 A * 10/1991 Jaeger ............... G01N 27/9046
324/233
5,698,910 A * 12/1997 Bryant ............... H02K 41/0352
310/12.04
(Continued)

FOREIGN PATENT DOCUMENTS

CN          1697964 A         11/2005
CN          1755507 A          4/2006
(Continued)

OTHER PUBLICATIONS

Korean Office Action dated Nov. 29, 2018, in corresponding Korean Application No. 10-2017-0062561 (10 pages in English, 6 pages in Korean).
(Continued)

*Primary Examiner* — Anthony J Daniels
(74) *Attorney, Agent, or Firm* — NSIP Law

(57) ABSTRACT

An apparatus to control a position of a camera module includes a magnetic member, a coil, a driver, a signal extractor, and a position detector. The magnetic member is disposed on a lens barrel of the camera module. The coil is disposed opposite to the magnetic member. The driver is configured to provide a position confirmation signal to the coil. The signal extractor is configured to extract a specific frequency component from a signal of the coil including the position confirmation signal and output a detection signal. The position detector is configured to provide a position signal corresponding to a position of the magnetic member based on the detection signal.

16 Claims, 6 Drawing Sheets

(58) Field of Classification Search
USPC .................................................. 348/208.99
See application file for complete search history.

(56) References Cited

U.S. PATENT DOCUMENTS

| | | | |
|---|---|---|---|
| 2006/0072913 A1 | 4/2006 | Noji | |
| 2006/0109372 A1 | 5/2006 | Noji | |
| 2006/0164075 A1* | 7/2006 | Niwa | G01D 3/0365 |
| | | | 324/207.16 |
| 2006/0208684 A1 | 9/2006 | Lee | |
| 2006/0269262 A1 | 11/2006 | Shin et al. | |
| 2006/0269263 A1 | 11/2006 | Kim et al. | |
| 2007/0188620 A1 | 8/2007 | Takahashi | |
| 2009/0085558 A1* | 4/2009 | David | H04N 5/2253 |
| | | | 324/207.2 |
| 2009/0224716 A1* | 9/2009 | Vig | G05B 19/19 |
| | | | 318/550 |
| 2011/0279899 A1 | 11/2011 | Motoike et al. | |
| 2012/0008220 A1 | 1/2012 | Lee et al. | |
| 2013/0050828 A1 | 2/2013 | Sato et al. | |
| 2014/0239874 A1 | 8/2014 | Inoue | |
| 2015/0207983 A1 | 7/2015 | Kang et al. | |
| 2015/0229814 A1* | 8/2015 | Macours | H02P 6/183 |
| | | | 348/374 |
| 2016/0258736 A1* | 9/2016 | Bachar | H04N 5/2254 |
| 2017/0350727 A1* | 12/2017 | Von Dahl | G01D 5/2013 |
| 2018/0057488 A1 | 3/2018 | Werner et al. | |

FOREIGN PATENT DOCUMENTS

| | | |
|---|---|---|
| CN | 1776515 A | 5/2006 |
| CN | 1834766 A | 9/2006 |
| CN | 1860397 A | 11/2006 |
| CN | 1869763 A | 11/2006 |
| CN | 1873474 A | 12/2006 |
| CN | 102292673 A | 12/2011 |
| CN | 102315748 A | 1/2012 |
| CN | 104852634 A | 8/2015 |
| CN | 104937482 A | 9/2015 |
| DE | 10 2014 016 189 A1 | 5/2016 |
| EP | 1 775 614 A1 | 4/2007 |
| JP | 61-82174 A | 4/1986 |
| JP | 2014-168326 A | 9/2014 |
| KR | 10-1166418 B1 | 7/2012 |
| KR | 10-2014-0088308 A | 7/2014 |
| KR | 10-2015-0080367 A | 7/2015 |
| KR | 10-2015-0097998 A | 8/2015 |
| KR | 10-2016-0110032 A | 9/2016 |

OTHER PUBLICATIONS

"Sample and hold circuit", *Learn and Grow*, Nov. 10, 2016, http://www.youtube.com/watch?v=qQytbsevBBk.

United States Office Action dated Apr. 18, 2019 in corresponding U.S. Appl. No. 15/701,576.

Chinese Office Action dated Mar. 3, 2020 in corresponding Chinese Patent Application No. 201711159221.3 (14 pages in English, 9 pages in Chinese).

Chinese Office Action dated Jan. 16, 2020 in corresponding Chinese Patent Application No. 201711158825.6 (27 pages in English, 17 pages in Chinese).

\* cited by examiner

US 10,855,891 B2

APPARATUS FOR CONTROLLING POSITION OF CAMERA MODULE

CROSS-REFERENCE TO RELATED APPLICATION(S)

This application claims benefit under 35 U.S.C. § 119(a) of Korean Patent Application No. 10-2016-0154705 filed on Nov. 21, 2016, Korean Patent Application No. 10-2017-0018737 filed on Feb. 10, 2017 and Korean Patent Application No. 10-2017-0043151 filed on Apr. 3, 2017 in the Korean Intellectual Property Office, the disclosures of which are incorporated herein by reference in their entirety.

BACKGROUND

1. Field

The present disclosure relates to an apparatus to control a position of a camera module.

2. Description of Related Art

In order to provide portable communication terminals, such as mobile phones, personal digital assistants (PDAs), portable personal computers (PCs), and other similar electronic devices, it is desired for a camera module for such portable communication terminals to have a small thickness, with a structural configuration that is able to capture high resolution images. In order to satisfy such configuration, a lens is needed to be included in the camera module with a high aspect ratio, capable of performing effective autofocusing, optical image stabilization (OIS), or the like. However, in order to perform autofocusing or OIS, it is necessary to accurately detect a current position value of the lenses and determine an accurate position of the lenses.

As an existing technology, a method to perform position control using a hall sensor and a magnet for sensing a position may be used.

In the case of using the hall sensor, a separate magnet may be required. In this case, a reference value for a position of the hall sensor may be changed, depending on temperature or other external particulars. Therefore, in order to correct such a problem, an additional circuit such as a low pass filter, an automatic gain control (AGC), a differential to single amplifier, an analog-to-digital converter, or the like, is required.

Further, when implementing an external hall sensor in the camera module, a bias current (having a level of several milliamperes for example) to drive the hall sensor, may be consumed, and current may be additionally consumed by various amplifiers (AMPs), and other electronic circuits.

In order to solve problems such as mechanical design limitations of camera modules, additional current consumption, and a rise in material costs, and other problems as described above, an apparatus configured to perform position detection and position control without using the hall sensor is required.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Examples provide an apparatus to control a position of a camera module in which a separate sensor such as a hall sensor, is excluded. The lens barrel is driven and a position thereof is detected and determined through a coil.

In accordance with an embodiment, there is provided an apparatus to control a position of a camera module, including: a magnetic member disposed on a lens barrel of the camera module; a coil disposed opposite to the magnetic member; a driver configured to provide to the coil a position confirmation signal, which comprises a specific frequency component; a signal extractor configured to extract a detection signal, comprising the specific frequency component, from a signal of the coil; and a position detector configured to provide a position signal corresponding to a position of the magnetic member based on the detection signal.

The driver may be configured to provide to the coil an overlapped driving signal, in which the position confirmation signal and a driving signal overlap each other.

The position detector may be configured to detect impedance of the coil using the detection signal and the position confirmation signal, and configured to provide the position signal corresponding to the position of the magnetic member based on the impedance of the coil.

The driving signal may be a direct current (DC) current, the position confirmation signal may be an alternating current (AC) current comprising the specific frequency component, and the detection signal may be an AC voltage comprising the specific frequency component.

The apparatus may also include: a controller configured to provide to the driver a feedback signal to control a position error based on the position signal from the position detector and a position reference signal.

In accordance with an embodiment, there is provided an apparatus to control a position of a camera module, including: a magnetic member disposed on a lens barrel of the camera module; a coil disposed opposite to the magnetic member; a driver configured to provide to the coil a position confirmation signal, comprising a specific frequency component; a signal extractor configured to extract a detection signal, comprising the specific frequency component, from a signal of the coil; and a position detector configured to detect a magnitude of impedance of the coil using the detection signal and the position confirmation signal, and configured to provide a position signal corresponding to a position of the magnetic member based on a magnitude of the impedance of the coil.

The driver may be configured to provide to the coil an overlapped driving signal, in which the position confirmation signal and a driving signal overlap each other.

The driving signal may be a DC current, the position confirmation signal may be an AC current comprising the specific frequency component, and the detection signal may be an AC voltage comprising the specific frequency component.

The apparatus may also include: a controller configured to generate to the driver a feedback signal to control a position error based on the position signal from the position detector and a position reference signal.

In accordance with an embodiment, there is provided an apparatus to control a position of a camera module, including: a magnetic member disposed on a lens barrel of the camera module; a coil disposed opposite to the magnetic member; a driver configured to provide to the coil a position confirmation signal, comprising a specific frequency component, to the coil; a signal extractor configured to extract a detection signal, comprising the specific frequency component, from a signal of the coil; and a position detector configured to detect an angle of impedance of the coil using the detection signal and the position confirmation signal, and configured to provide a position signal corresponding to a position of the magnetic member, based on the angle of the impedance of the coil.

The driver may be configured to provide to the coil an overlapped driving signal, in which the position confirmation signal and a driving signal overlap each other.

The driving signal may be a DC current, the position confirmation signal may be an AC current comprising the specific frequency component alternating current, and the detection signal may be an AC voltage having the specific frequency component.

The apparatus may also include: a controller configured to provide to the driver a feedback signal to control a position error based on the position signal from the position detector and a position reference signal.

In accordance with an embodiment, there is provided an apparatus for a camera module, including: a magnetic member disposed on a lens barrel of the camera module opposite to a coil configured to drive the magnetic member; a driver configured to generate a position confirmation signal including a specific frequency component; a signal extractor configured to extract a detected voltage, including the specific frequency component, from a voltage across the coil and output a detection signal indicative thereof; and a position detector configured to calculate a magnitude and an angle of an impedance of the coil using the detection signal and the position confirmation signal to detect the position of the lens barrel and output a position signal indicative thereof.

The driver may generate the position confirmation signal independently of a driving signal to the coil.

The impedance of the coil may be calculated using a ratio between the detection signal and the position confirmation signal where the detection signal is a detected voltage and the position confirmation signal is a position confirmation current.

The apparatus may include: a controller configured to produce a feedback signal to the driver to control a position error of the magnet, based on the position signal from the position detector and a position reference signal.

In accordance with an embodiment, there is provided an apparatus for a camera module, including: a coil mounted on a side of a housing of a camera module, opposite to a magnetic member to provide a driving force to the magnetic member; a driver configured to generate to the coil an overlapped driving signal including a position confirmation signal overlapped with a driving signal; a signal extractor configured to extract a detected voltage from a voltage across the coil and output a detection signal indicative thereof, wherein the detection signal includes the specific frequency component, which is an amount of change in an impedance of the coil; and a position detector configured to detect the impedance of the coil using the detection signal and the position confirmation signal and generate a position signal corresponding to a position of the magnetic member, based on the impedance of the coil.

The overlapped driving signal may be an overlapped driving current and the driver may generate the driving signal as a DC current to drive the lens barrel.

The driver may generate the position confirmation signal as an AC current to confirm a position of the lens barrel.

The driver may include a full bridge circuit bidirectionally driven.

The apparatus may include: a controller configured to produce a feedback signal to the driver to control a position error of the magnet, based on the position signal from the position detector and a position reference signal.

Other features and aspects will be apparent from the following detailed description, the drawings, and the claims.

Figure 1:
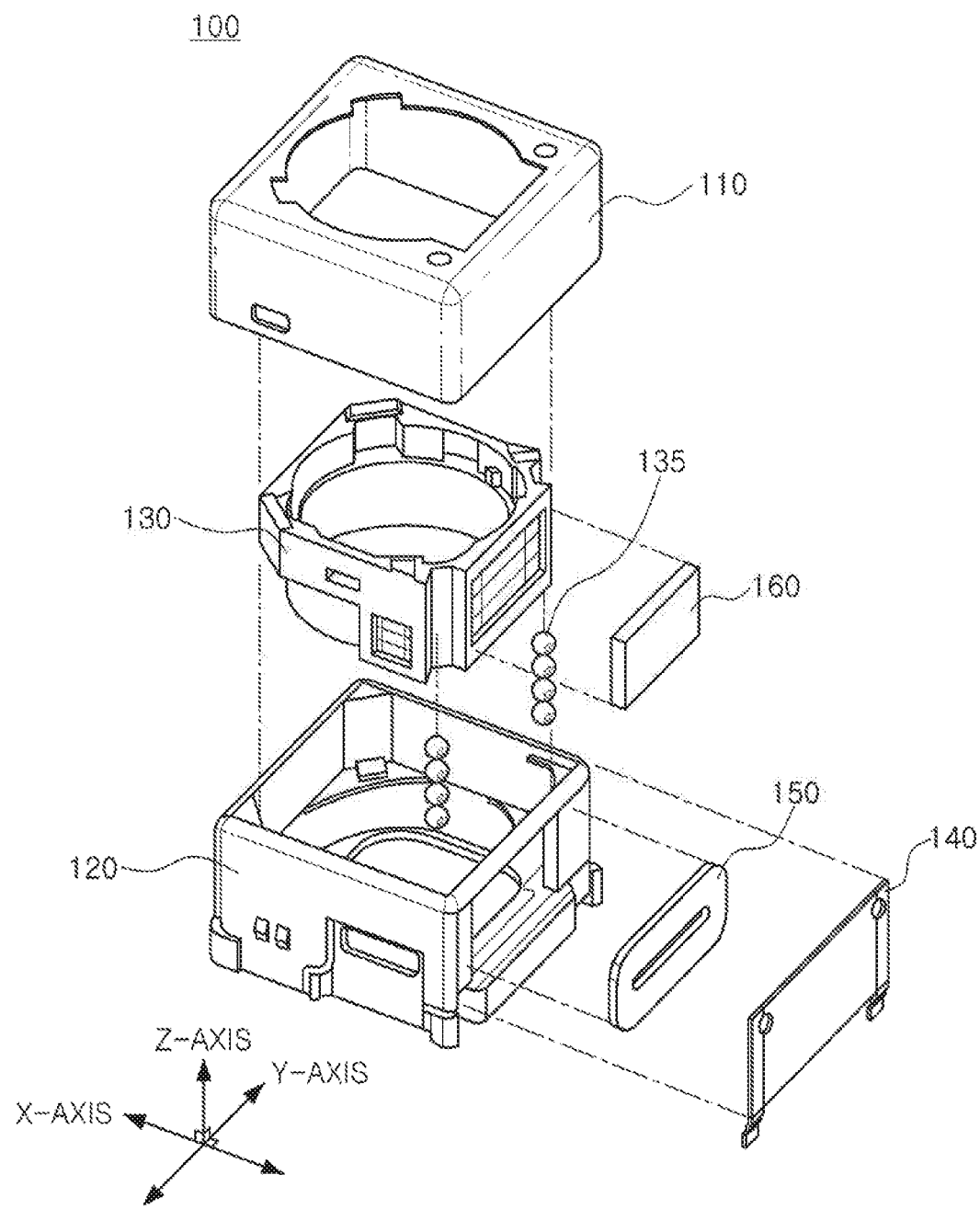
FIG. 1 is an exploded perspective view illustrating a camera module, according to an example.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The features described herein may be embodied in different forms, and are not to be construed as being limited to the examples described herein. Rather, the examples described herein have been provided so that this disclosure will be thorough and complete, and will convey the full scope of the disclosure after an understanding of the disclosure of this application.

Hereinafter, reference will now be made in detail to examples with reference to the accompanying drawings, wherein like reference numerals refer to like elements throughout.

Various alterations and modifications may be made to the examples. Here, the examples are not construed as limited to the disclosure and should be understood to include all changes, equivalents, and replacements within the idea and the technical scope of the disclosure.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

When an element is referred to as being "on," "connected to," "coupled to," or "adjacent to," another element, the element may be directly on, connected to, coupled to, or adjacent to, the other element, or one or more other intervening elements may be present.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "include/comprise" and/or "have" when used in this specification, specify the presence of stated features, integers, steps, operations, elements, components, and/or combinations thereof, but do not preclude the presence or addition of one or more other features, numbers, steps, operations, elements, components, and/or groups thereof.

Unless otherwise defined, all terms, including technical terms and scientific terms, used herein have the same meaning as how they are generally understood after an understanding of the disclosure of this application. Any term that is defined in a general dictionary shall be construed to have the same meaning in the context of the relevant art, and, unless otherwise defined explicitly, shall not be interpreted to have an idealistic or excessively formalistic meaning.

Identical or corresponding elements will be given the same reference numerals, regardless of the figure number, and any redundant description of the identical or corresponding elements will not be repeated. Throughout the description of the present disclosure, when describing a certain relevant conventional technology is determined to evade the point of the present disclosure, the pertinent detailed description will be omitted. Terms such as "first" and "second" can be used in describing various elements, but the above elements shall not be restricted to the above terms. The above terms are used only to distinguish one element from the other. In the accompanying drawings, some elements may be exaggerated, omitted or briefly illustrated, and the dimensions of the elements do not necessarily reflect the actual dimensions of these elements.

FIG. 1 is an exploded perspective view illustrating a camera module, according to an example.

Referring to FIG. 1, a camera module 100, according to an example, includes a case 110, a housing 120, a lens barrel 130, a substrate 140, a coil 150, and a magnetic member 160.

In addition, the camera module 100 further includes ball bearings 135.

Although FIG. 1 illustrates four ball bearings 135 to move the lens barrel 130 in an optical axis direction, a single ball bearing 135 may be implemented or more, on each guide portion of the lens barrel 130.

A ball bearing type camera module using the ball bearings is illustrated in FIG. 1. However, the present disclosure is not limited thereto, and may also be applied to a spring type camera module, by way of example.

The lens barrel 130 may have a hollow cylindrical shape so that at least one lens imaging a subject is positioned and accommodated therein. The lens are disposed in the lens barrel 130 along an optical axis direction, from an object side (position of subject) to an image side (position of image sensor). Here, the optical axis direction refers to a Z-direction, in relation to the lens barrel 130, illustrated in FIG. 1. Also, the optical axis is a line along which there is some degree of rotational symmetry in an optical system such as a camera lens or microscope. The optical axis is an imaginary line that defines the path along which light propagates through at least one lens, up to first approximation. For a lens system including lenses and mirrors, the axis passes through the center of curvature of each surface, and coincides with the axis of rotational symmetry. The optical axis is often coincident with the system's mechanical axis, but not always, as in the case of off-axis optical systems.

The lens barrel 130 is disposed in the housing 120 and is coupled to the housing 120 to move in the optical axis direction for the purpose of autofocusing and to move in directions (for example, an X-axis direction or a Y-axis direction of FIG. 1) perpendicular to the optical axis direction for the purpose of optical image stabilization (01S). Although the lens barrel 130 is illustrated in FIG. 1 as a single structural element, in an alternative example, the lens barrel 130 may be formed of multiple pieces, which would be coupled, bonded, fused, or attached to each other using a mechanical element, such as a bracket, into a single piece as shown in FIG. 1 for the lens barrel 130.

The housing 120 has an internal space, and accommodates the lens barrel 130 in the internal space of the housing 120 so that the lens barrel 130 moves in the optical axis direction or in the directions perpendicular (X-axis direction or Y-axis direction) to the optical axis direction.

When the lens barrel 130 moves in the optical axis direction within the housing 120, as a guide unit guiding movement of the lens barrel 130, at least one ball bearing among the ball bearings 135 is positioned to move in the optical axis direction in the lens barrel 130.

The at least one ball bearing among the ball bearings 135 is disposed between the lens barrel 130 and the housing 120 so that one surface of the lens barrel 130 and one surface of the housing 120 are in contact with each other and, thus, guides the movement of the lens barrel 130 in the optical axis direction, while supporting the lens barrel 130 in a rolling motion.

The case 110 is coupled to the housing 120 to form an exterior of the camera module. The case 110 is coupled to the housing 120 to surround a portion of an outer surface of the housing 120. The case 110 may include a metal or may be formed of a metal to be, thus, grounded to a ground pad of the substrate mounted on a lower portion of the housing 120, resulting in blocking the electromagnetic waves generated during driving of the camera module. In accordance with an embodiment, the housing 120 and the lens barrel 130 include guide parts to receive the ball bearings 135. A shape of one of the guide parts may be different from that of the other guide parts. For example, the one of the guide parts may be formed as a V-like groove, and the other guide parts may be formed as a U-like groove. A shape of the other guide parts is not particularly limited to a particular shape as long as, in one example, the other guide parts are different from the shape of the one of the guide parts. In an alternative example, all of the guide parts include a same shape.

In the case in which the other guide parts is different from that of the guide part, a separation of the ball member 135 may be prevented while the lens barrel 135 is vertically moved for autofocusing. In an example, at least one of the guide parts may have a flat surface or a flat surface connected to an inclined portion.

The magnetic member 160 is disposed on one side surface of the lens barrel 130, and the coil 150 is disposed on one surface of the substrate 140 mounted on the housing 120, opposite to the magnetic member 160. As an example, the magnetic member 160 is a magnet including a magnetic material having magnetic properties, or is a conductor.

Although not illustrated in FIG. 1, a stopper may be additionally disposed between the case 110 and the lens barrel 130 to limit a movement distance of the lens barrel 130. In one example, the stopper is a single structural element. In another example, the stopper is be formed of at least two separate plates operatively and mechanically connected to each other to, at least, restrict the travel distance of a lens module including the lenses. In addition, the camera module 100 may further include a yoke mounted on the other surface of the substrate 140 to prevent leakage of magnetic flux generated between the magnetic member 160 and the coil 150.

A structure in which an alternating current (AC) current is used as a position confirmation signal and a detected voltage is used as a detection signal is described in an example, but the present application is not limited thereto. That is, a structure in which an AC voltage is used as the position confirmation signal and an AC current is used as the detection signal may be used.

In the respective drawings in the present application, overlapping descriptions of components denoted by the same reference numerals and having the same functions will be omitted, and contents different from each other will be described in the respective drawings.

Figure 2:
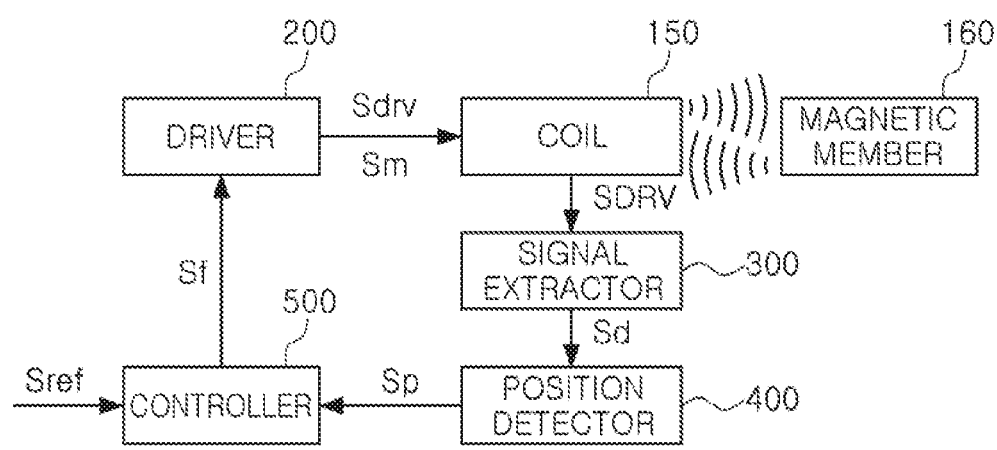
FIG. 2 is a block diagram of an apparatus to control a position of a camera, module according to an example.
Figure 3:
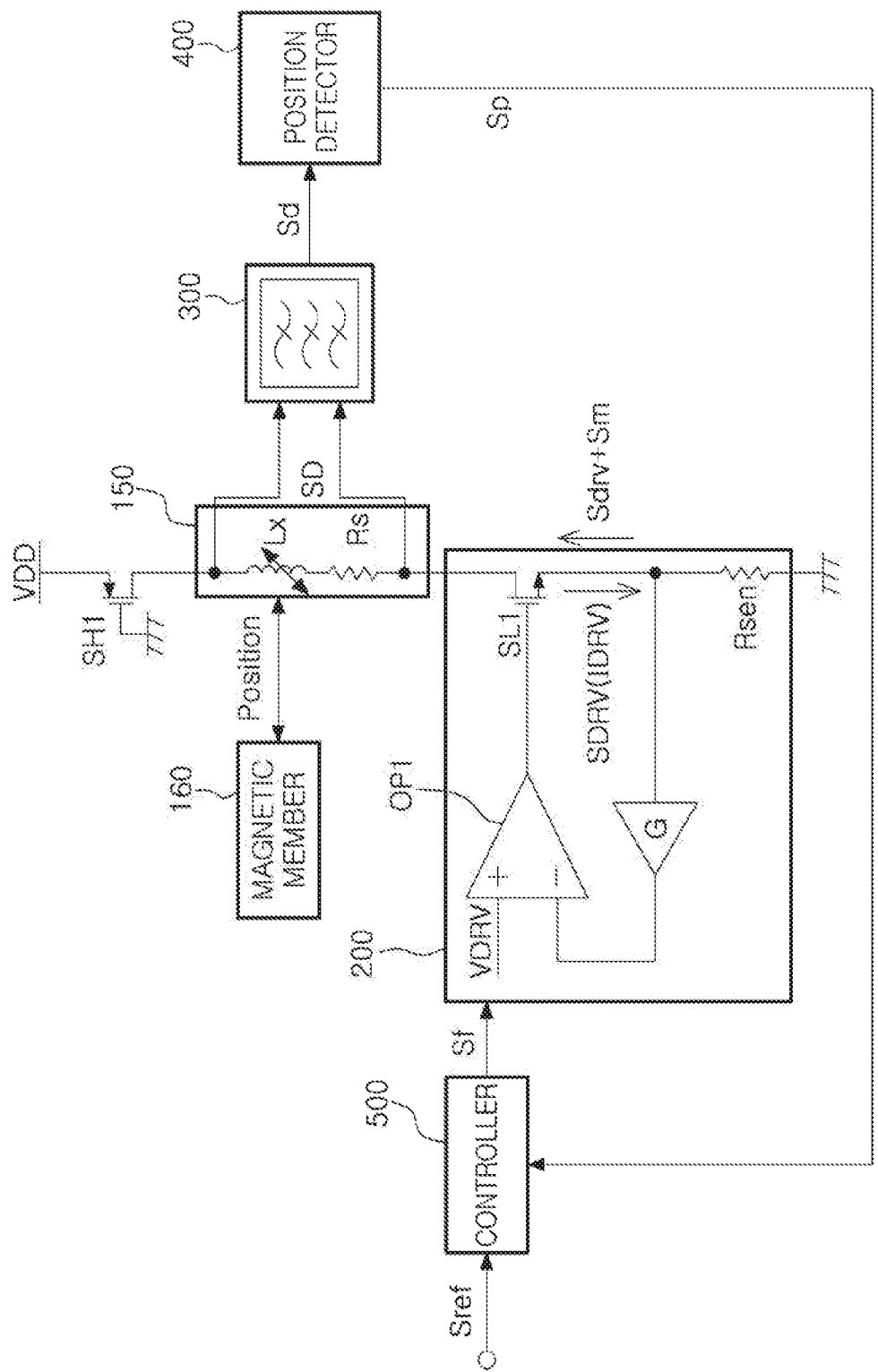
FIG. 3 is a circuit diagram of the apparatus to control a position of a camera module of the example of FIG. 2.

FIG. 2 is a block diagram of an apparatus to control a position of a camera module, according to an example. FIG. 3 is a circuit diagram of the apparatus to control a position of a camera module of the example of FIG. 2.

Referring to FIGS. 2 and 3, an apparatus to control a position of a camera module, according to an example, is illustrated.

The apparatus to control a position of a camera module includes a coil 150, a magnetic member 160, a driver 200, a signal extractor 300, and a position detector 400. In addition, the apparatus to control the position of the camera module further includes a controller 500.

The coil 150 is disposed on one surface of the substrate 140 (see FIG. 1), which is mounted on one side of the housing 120 (see FIG. 1), opposite to the magnetic member 160. The coil 150 is spaced apart from the magnetic member 160 to provide a driving force through an electromagnetic force to the magnetic member 160.

The magnetic member 160 is disposed on one side surface of the lens barrel 130, and moves as a result of the driving force from the coil 150.

The driver 200 outputs or generates a position confirmation signal, Sm, to the coil 150. The position confirmation signal, Sm, includes a specific frequency component, Fmod. The specific frequency component, Fmod, a frequency indicative of an amount of change in the impedance of the coil 150 without having an influence on driving of the lens barrel 130, is higher than an audio frequency. As an example, the frequency component, Fmod, is generally higher than 20 to 20,000 Hz.

As an example, the driver 200 outputs or generates the position confirmation signal, Sm, independently of a driving signal, Sdrv, to the coil 150. As another example, in order to more accurately and quickly control a closed loop position, the driver 200 outputs or generates to the coil 150 an overlapped driving signal, SDRV, in which the position confirmation signal, Sm, and the driving signal, Sdrv, overlap with each other.

As an example, the position confirmation signal, Sm, is an AC signal including at least one specific frequency component, Fmod. The position confirmation signal, Sm, may be a sinusoidal wave signal, a triangle wave signal, a sawtooth wave signal, a square wave signal, or other type of signal.

In each example, the position confirmation signal, Sm, is not limited to the signals described above, but may be any AC signal, including a specific frequency component.

For example, when the driver 200 applies the driving signal, Sdrv, to the coil 150, as current flows through the coil 150, an electromagnetic force is generated, and due to the electromagnetic force, driving force is provided to the magnetic member 160.

In other words, the driver 200 applies a driving signal, Sdrv, to the coil 150 to provide the driving force to the magnetic member 160. As an example, when the driver 200 applies the driving signal, Sdrv, to the coil 150, a magnetic field is generated in the coil 150, and the magnetic field generated in the coil 150 interacts with a magnetic field of the magnetic member 160 to generate the driving force moving the lens barrel 130 in the optical axis direction (or the directions perpendicular to the optical axis direction) based on Fleming's left hand rule.

Therefore, the driving force drives the lens barrel 130 to move in the optical axis direction or the directions perpendicular to the optical axis direction.

As an example, the driver 200 includes a driver integrated circuit (IC) configured to generate a driving signal to the magnetic member 160.

As an example, in response to the overlapped driving signal, SDRV, being an overlapped driving current, IDRV, the driving signal, Sdrv, is a DC current generated by the driver 200 to drive the lens barrel 130. The position confirmation signal, Sm, is an AC current generated by the driver 200 to confirm a position of the lens barrel 130, and having the specific frequency component, Fmod. The detection signal, Sd, is an AC voltage including the specific frequency component, Fmod, as a signal extracted from the coil 150.

For example, upon the overlapped driving signal SDRV being the overlapped current, IDRV, the overlapped driving current, IDRV, is represented by Equation 1:

$$IDRV = Idrv + im = Idrv + k*\sin(2*\pi*Fmod*t) \quad \text{[Equation 1]}$$

Here, Idrv, is a DC driving current corresponding to the driving signal, Sdrv, and, im, is an AC position confirmation current corresponding to the position confirmation signal, Sm, which are defined by $k*\sin(2*\pi*Fmod*t)$. In addition, k is an amplitude of the position confirmation current.

A magnitude, k, and the specific frequency component, Fmod, of the position confirmation signal, Sm, are in a range in which the magnitude, k, and the specific frequency component, Fmod, measure an amount of change in inductance of the coil 150 without having an influence on the driving of the lens barrel 130. As an example, the magnitude, k, of the position confirmation signal, Sm, is smaller than a magnitude of a driving signal to prevent an influence on the driving of the lens barrel 130. Further, the specific frequency component, Fmod, of the position confirmation signal, Sm, does not have an influence on the driving of the lens barrel 130. Here, a phrase "does not have an influence on the driving" means that the frequency does not generate movement or resonance on the lens barrel.

For example, the magnitude, k, of the position confirmation signal, Sm, is smaller than a magnitude of the driving signal, and the specific frequency component, Fmod, of the position confirmation signal, Sm, is higher than an audio frequency. As an example, in a case in which the magnitude of the driving signal is 100 mA, the magnitude, k, of the position confirmation signal, Sm, is 5 mA, and the specific frequency component, Fmod, of the position confirmation signal, Sm, is 100 kHz.

The signal extractor 300 extracts from the overlapped driving signal, SDRV, to generate a detection signal, Sd, including the specific frequency component, Fmod.

As an example, the signal extractor 300 includes a filter that extracts from the overlapped driving signal, SDRV, to produce an AC detection signal, Sd, which includes the specific frequency component Fmod.

The overlapped driving signal, SDRV, is an overlapped current or an overlapped voltage. In an example in which the overlapped driving signal, SDRV, is the overlapped driving current, IDRV, when the overlapped driving current, IDRV, flows through the coil 150, the signal extractor 300 extracts a detected AC voltage, Vd, from a voltage (VL of Equation 2) across the coil 150.

The position detector 400 generates a position signal, Sp, corresponding to a position of the magnetic member 160 based on the detection signal, Sd.

The position detector 400 detects impedance, ZL, of the coil 150 using the detection signal, Sd, and the position confirmation signal, Sm, and generates the position signal, Sp, corresponding to a position of the magnetic member 160, based on impedance of the coil 150. In other words, the position detector 400 detects a position of the magnetic member 160 according to the impedance of the coil 150, which varies based on the movement of the magnetic member 160.

In an example in which the detection signal Sd is the detected voltage, Vd, and the position confirmation signal, Sm, is a position confirmation current, im, the impedance of the coil 150 is calculated using a ratio between the detected voltage, Vd, and the position confirmation current, im.

As described above, the position detector 400 detects the position of the lens barrel 130 driven by the driver 200, in detail, the position of the magnetic member 160 provided on one side surface of the lens barrel 130. The position detector 400 outputs the position signal, Sp, corresponding to a position of the magnetic member 160, to the controller 500.

In this case, the position detector 400 calculates a magnitude and an angle of the impedance of the coil 150 to detect the position of the lens barrel 130, which will be illustrated with reference to FIGS. 6 and 7.

The controller 500 produces a feedback signal, Sf, to the driver 200 to control a position error, based on the position signal, Sp, from the position detector 400 and a position reference signal, Sref.

As an example, the controller 500 compares the position signal, Sp, provided from the position detector 400 with the position reference signal, Sref, and outputs the feedback signal, Sf, indicative of the comparison to compensate for the position error corresponding to a difference between the position signal, Sp, and the position reference signal, Sref, to the driver 200, so that the position of the magnetic member 160 is precisely controlled.

In one example, the driver 200, the signal extractor 300, the position detector 400, and the controller 500 are mounted on the substrate 140, or are mounted on a specific substrate separate from the substrate 140, the substrate 140 or the specific substrate may be a flexible printed circuit board (FPCB). In one example, the substrate 140 is a single FPCB or a plurality of FPCBs coupled together through, for example, soldering, welding, or connectors, such as a bracket. The substrate 140 is disposed on the housing 120 as illustrated in FIG. 1 or is disposed in an inner hollow of the lens barrel 130.

Here, a position of the specific substrate is not particularly limited. In other words, the specific substrate may be disposed in the camera module.

In addition, the driver 200, the signal extractor 300, the position detector 400, and the controller 500 may be implemented as one integrated circuit (IC) and may be disposed on one substrate or may be implemented as two or more integrated circuits and may be disposed on one substrate or two or more substrates, depending on the needs of a manufacturer. Such an IC is not limited to being disposed in a specific position, but may be disposed in any position.

Referring to FIG. 3, the coil 150 is illustrated as a resistance component Rs and an inductance component Lx, and the coil 150 is connected to a plurality of switching elements (referring to FIGS. 3 and 4), so an overlapped signal (SDRV=Sdrv(DC)+Sm(AC)) is applied in a voice coil motor scheme.

Hereafter, the driver 200 adjusts a control signal, VDRV, based on the feedback signal, Sf, received from the controller 500, so that the driving signal, Sdrv, is corrected. Thus, the driving signal is provided to the coil 150, so that a position of the lens barrel 130 may be precisely adjusted.

As an example, as shown in FIG. 3, the driver 200 includes an operational amplifier OP1, a first low-side switch SL1 (for example, a MOS transistor), and a resistance Rsen, and further includes a gain controlling unit G.

When the control signal, VDRV, input to the operational amplifier is a control voltage and the overlapped driving signal, SDRV, is the overlapped driving current, IDRV, the overlapped driving current, IDRV, flowing through the resistance, Rsen, is determined based on the control voltage, and a voltage across the resistance, Rsen, is determined using the overlapped driving current, IDRV. In an example, the control voltage, VDRV, is equal to the product of the overlapped driving current, IDRV, the resistance, Rsen, and a gain. As an example, when a gain of the gain controlling unit, G, is 1, a voltage across the resistance Rsen is equal to the control voltage, VDRV. In an example, the resistance Rsen is an actual resistance component, or is an equivalent circuit.

In addition, a driver illustrated in FIG. 3 is an example of a structure for feedback by changing a current signal to a signal in a form of a voltage using the resistance, Rsen. The driver, according to an example, is not limited to a structure illustrated in FIG. 3, and may have a structure in which a current signal is copied without the resistance Rsen.

Figure 4:
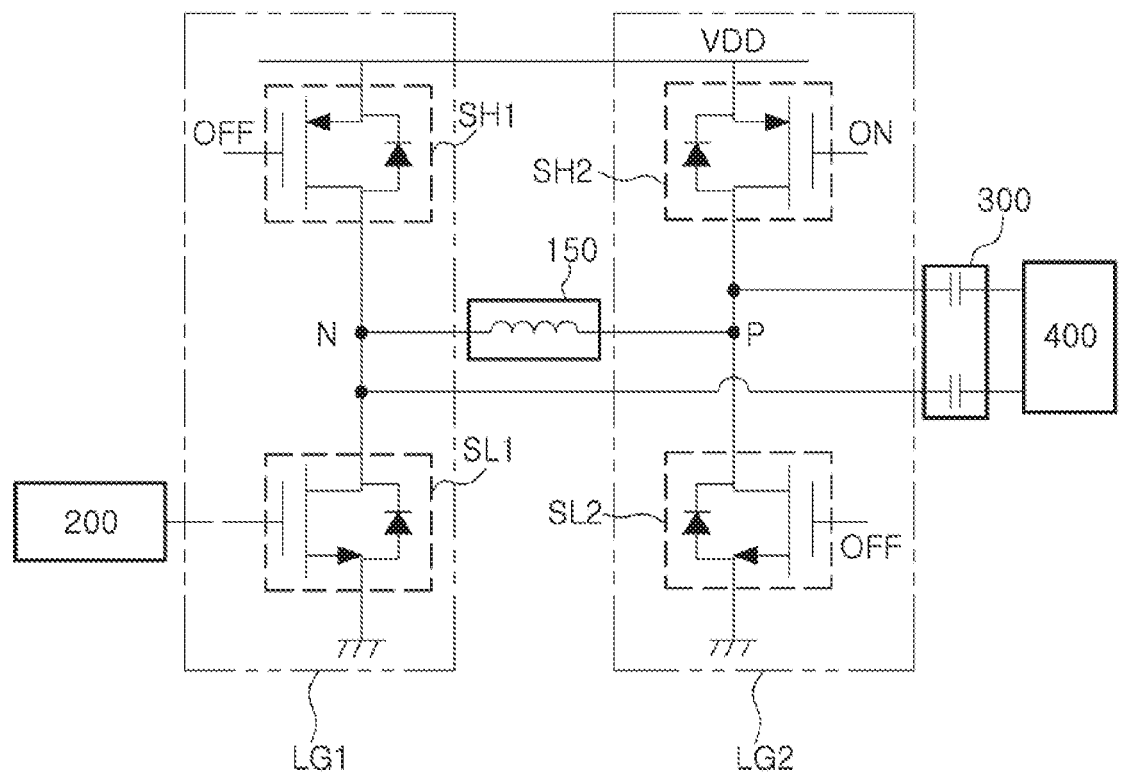
FIG. 4 is a circuit diagram of a driver, according to an example.

FIG. 4 is a circuit diagram of a driver, according to an example.

Referring to FIGS. 3 and 4, the driver 200 may include a full bridge circuit to be driven bidirectionally. A full bridge circuit is illustrated by way of example, but the present disclosure is not limited thereto. A partial bridge circuit may be implemented instead of a full bridge circuit, as well, as a Wheatstone bridge, a Wien bridge, a Maxwell bridge, an H bridge, a Fontana bridge, a Kelvin bridge, a Bridged T circuit, a Carey Foster bridge, or a Lattice bridge.

The full bridge circuit includes a first leg, LG1, having a first high-side switch, SH1, and a first low-side switch, SL1, connected between a power, VDD, and a ground in series, and a second leg, LG2, having a second high-side switch, SH2, and a second low-side switch, SL2, connected between the power, VDD, and the ground in series.

Here, the first low-side switch, SL1, is included in the driver 200 as illustrated in FIG. 3, or may be outside the driver 200 as illustrated in FIG. 4.

As shown in FIG. 4, the coil 150 is connected between an access node, N, located between the first high-side switch, SH1, and the first low-side switch, SL1, and an access node, P, located between the second high-side switch, SH2 and the second low-side switch, SL2.

In this example, when the first high-side switch, SH1, and the second low-side switch, SL2, are turned off and the second high-side switch, SH2, and the first low-side switch, SL1, are turned on, a driving signal in the coil 150 flows from the second high-side switch, SH2, to the first low-side switch, SL1. In this example, the driver 200 connected to the first low-side switch, SL1, adjusts a driving signal flowing through the coil 150. Alternatively, although not illustrated in the drawing, the driver 200 is connected to the second high-side switch.

On the other hand, when the first high-side switch, SH1, and the second low-side switch, SL2, are turned on and the second high-side switch, SH2, and the first low-side switch, SL1, are turned off, a driving signal in the coil 150 flows from the first high-side switch, SH1, to the second low-side switch, SL2. In this example, a driver (not shown) connected to the second low-side switch, SL2, adjusts a driving signal flowing through the coil 150. Alternatively, although not illustrated in the drawing, the driver may be connected to the first high-side switch.

As described above, a driving signal may be applied to the coil 150 bidirectionally, and driving force may be generated by the coil 150 bidirectionally, depending on the bidirectional driving signal, resulting in a movement of a lens barrel in the optical axis direction or in the directions perpendicular to the optical axis direction, due to the bidirectional driving force from the coil 150.

In an example in which the position confirmation signal, Sm, is the AC position confirmation current, im, and the detection signal, Sd, is the AC detected voltage, Vd, when the driver 200 applies an AC position confirmation current (an AC current) to the coil 150, the AC detected voltage, Vd, across the coil 150 is measured so that impedance of the coil 150 may be measured.

Thus, a first detected AC voltage (Vd1 of FIG. 8) across the coil 150 when the AC position confirmation current, im, is applied to a coil, at a first position of the lens barrel 130, is different from a second detected AC voltage (Vd2 of FIG. 8) across the coil 150 when the AC position confirmation current, im, is applied to the coil 150, at a second position of the lens barrel 130, moving from the first position thereafter. Therefore, an AC detected voltage across the coil 150 is detected, so that a position of a lens barrel is recognized.

As a result of a change in a magnetic field and a change in an Eddy current due a change in a distance between the coil 150 and the magnetic member 160, an overlapping area therebetween, and the like, an amount of change in impedance of a coil may occur, which may cause a difference in an amplitude of a detection signal, a maximum value, a phase, or a root mean square (RMS).

Thus, the position detector 400 detects a change in impedance of the coil 150 for position recognition based on a detection signal extracted by the signal extractor 300.

Regarding a description of a position detection principle in a camera module, according to an example, a static magnetic field is formed in the coil 150 and the magnetic member 160 during driving. When the AC position confirmation signal, Sm, is applied to a coil, a magnetic field changes into a dynamic magnetic field. Due to the dynamic magnetic field described above, an Eddy current occurs in the magnetic member 160.

The Eddy current (or a vortex current) is generated when a magnetic field, changing over time, passes through a conductor. When the magnetic field is changed, a circulating current of an electron is generated in the conductor. In this case, the circulating current is referred to as an Eddy current. The Eddy current has a direction hindering or preventing a magnetic field, passing through a magnetic member, from changing. The Eddy current is generated when the magnetic member (or a conductor) moves in a magnetic field or a changing magnetic field passes above a static conductor. In addition, the Eddy current is generated when a magnetic member (or a conductor) moves in a changing magnetic field. When there is a change in strength or a direction of a magnetic field, the Eddy current is generated in any portion except for a boundary point of the magnetic member (or the conductor) in the magnetic field.

Thereafter, when there is the difference in a distance between the coil 150 and the magnetic member 160, an overlapping area therebetween, or the like, an Eddy current in the magnetic member 160 changes. Thus, a change in a magnetic field by a change in the Eddy current has an influence on a coil, so a change in impedance of the coil occurs.

As an example, a change in an Eddy current of a magnetic member generated due to an AC position confirmation signal and a magnetic field thereof occurs according to a relative position (for example, a distance, an area, or the like) between a coil and a magnetic member, and the change is reflected in impedance of a coil.

As previously described, as a result of a change in a distance between the coil 150 and the magnetic member 160, an overlapping area therebetween, a change in a magnetic field, or a change in an Eddy current occurs. Consequently, an amount of change in impedance of a coil occurs.

An example of an overlapping area between the coil 150 and the magnetic member 160 will be described with reference to FIGS. 5A, 5B, 5C, and 5D.

FIGS. 5A, 5B, 5C, and 5D are a schematic view in axial directions and schematic views illustrating relative positions of a coil to a magnetic member, according to an example.

Figure 5A:
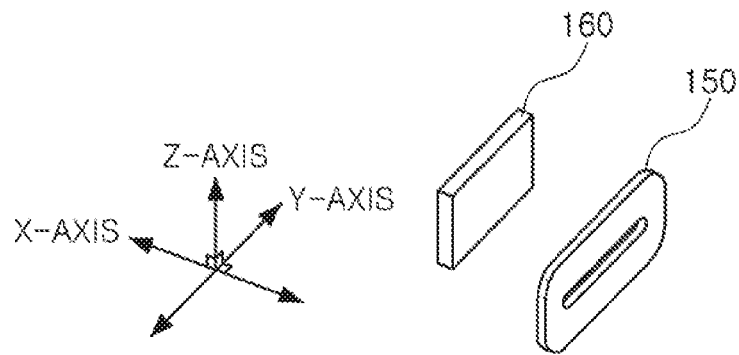
FIGS. 5A, 5B, 5C, and 5D are schematic views of relative positions of a magnetic member to a coil, according to an example.
Figure 5B:
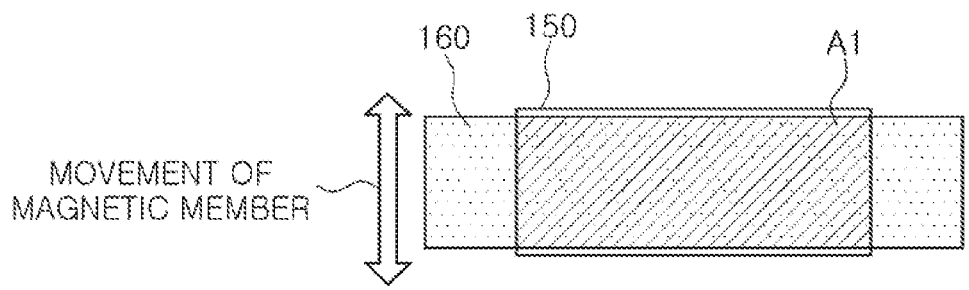
Figure 5C:
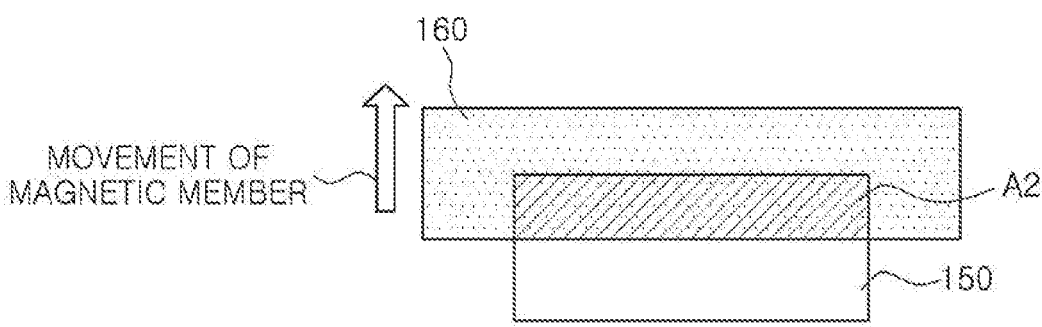
Figure 5D:
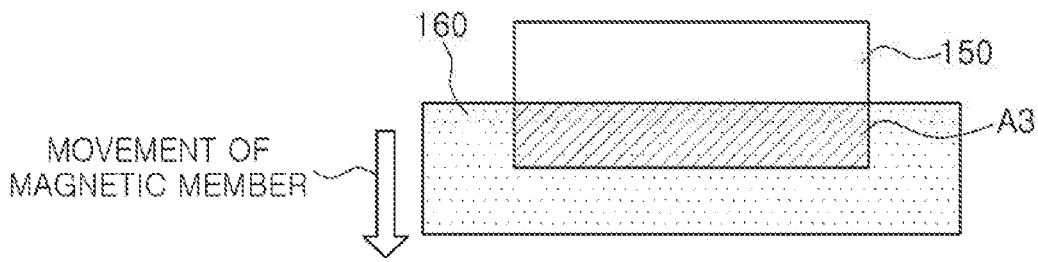

FIG. 5A is a schematic view of a coil and a magnetic member in X-axis, Y-axis, and Z-axis directions, according to an example. FIG. 5B is a schematic view of a regular position of the magnetic member to the coil, according to an example. FIG. 5C is a schematic view of a position of the magnetic member ascending in the Z-axis direction to the coil according to an example. FIG. 5D is a schematic view of a position of the magnetic member descending in the Z-axis direction to the coil, according to an example.

Referring to FIG. 5A, as illustrated in FIG. 1, the coil 150 and the magnetic member 160 are arranged opposite to each other. The Z-axis direction refers to the optical axis direction, and the X-axis direction and the Y-axis direction refer to the directions perpendicular to the optical axis direction.

The magnetic member 160 illustrated in FIG. 5B is disposed in a regular position corresponding to a preset default value. In this case, the overlapping area between the coil and the magnetic member determining the driving force is an area A1.

The magnetic member 160 illustrated in FIG. 5C is disposed in a position that ascends in the Z-axis direction due to a driving signal of the coil 150 in the first direction. In this example, the overlapping area between the coil and the magnetic member determining strength of an electromagnetic field between the coil 150 and the magnetic member 160 changes to an area A2 smaller than the area A1.

The magnetic member 160 illustrated in FIG. 5D is disposed in a position that descends in the Z-axis direction due to a driving signal of the coil 150 in the second direction. In this example, the overlapping area between the coil 150 and the magnetic member 160 determining strength of an electromagnetic field between the coil and the magnetic member changes to an area A3 smaller than the area A1.

As previously described, in an example in which the magnetic member 160 moves in the Z-axis direction, the overlapping area between the coil 150 and the magnetic member changes into A1, A2, or A3 so the strength of the electromagnetic field between the coil 150 and the magnetic member 160 changes, resulting in the change in the inductance of the coil 150.

As described above, when the impedance of the coil 150 changes during a period in which the AC position confirmation current as a driving signal is supplied to the coil 150, the AC voltage across the coil 150 changes depending on such a change in the impedance of the coil 150.

According to an example, a magnetic member having high magnetic permeability and paint formed of a magnetic material is disposed between the magnetic member 160 and the coil 150 in order to raise a change ratio in the inductance of the coil 150, depending on the movement of the position of the magnetic member 160.

As an example, in the case in which an overlapped driving signal SDRV is an overlapped driving current, IDRV, the signal extractor 300 extracts the detected voltage, Vd, including the specific frequency component, Fmod, from a signal of the coil 150, and provides the detected voltage to the position detector 400.

The position detector 400 detects a magnitude, |ZL|, of the impedance, ZL, of the coil 150 or an impedance angle, θ, using the position confirmation current, im, included in the overlapped driving current, IDRV, and the detected voltage, Vd. The position detector 400 also detects a position of the magnetic member 160, that is, a position of the lens barrel 130 using a magnitude, |ZL|, of the impedance, ZL, of the coil 150 and the impedance angle, θ.

Figure 6:
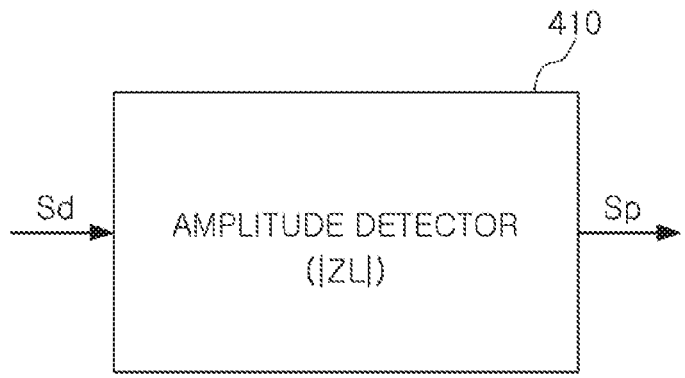
FIG. 6 is a schematic view of a position detector, according to an example.

FIG. 6 is a schematic view of a position detector, according to an example.

Referring to FIG. 6, the position detector 400 includes an amplitude detector 410.

As an example, the amplitude detector 410 detects a magnitude, |ZL|, of the impedance, ZL, of the coil 150 using the detection signal, Sd, from the signal extractor 300 and the position confirmation signal, Sm, and outputs the position signal, Sp, corresponding to the position of the magnetic member 160 based on the magnitude, |ZL|, of the impedance of the coil 150.

In this example, the magnitude |ZL| of the impedance is represented by Equation 2:

$$VL = IDRV * ZL \quad \text{[Equation 2]}$$

Here, VL is the voltage across the coil, IDRV is the overlapped driving current flowing to the coil, and |ZL| is the magnitude of the impedance of the coil.

In addition, the magnitude, |ZL|, of the impedance of the coil 150 is represented by Equation 3:

$$|ZL| = \sqrt{Rs^2 + (2*\pi*F\text{mod}*Lx)^2} \quad \text{[Equation 3]}$$

Here, Rs is a resistance component of the coil 150, Lx is an inductance component of the coil 150, and Fmod, a specific frequency component, is an audio frequency.

As an example, the amplitude detector 410 includes an amplifying circuit configured to amplify an amount of change in the inductance because an amount of change in the inductance of the coil 150 is very small.

Figure 7:
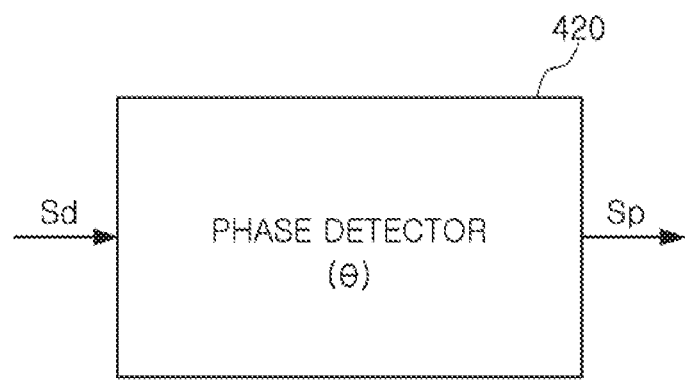
FIG. 7 is another schematic view of a position detector, according to an example.

FIG. 7 is another schematic view of a position detector, according to an example.

Referring to FIG. 7, the position detector 400 includes a phase detector 420.

The phase detector 420 detects an angle, θ, of the impedance, ZL, of the coil 150 using the detection signal, Sd, from the signal extractor 300 and the position confirmation signal, Sm, and outputs or generates the position signal, Sp, corresponding to a position of the magnetic member 160 based on the angle, θ, of the impedance of the coil 150.

The phase detector 420 detects a position of the magnetic member 160 from a change in the angle, θ, of the impedance of the coil 150.

Here, the angle, θ, of the impedance is represented by Equation 4:

$$\theta = a\tan\left(\frac{2*\pi*F\text{mod}*Lx}{Rs}\right) \quad \text{[Equation 4]}$$

In an example in which the position confirmation signal, Sm, is an AC current, im, and the detection signal, Sd, is an AC voltage, Vd, the phase detector 420 detects a phase difference between the detected voltage, Vd, from the signal extractor 300 and the position confirmation current, im.

As an example, the phase detector 420 outputs a pulse signal having a pulse width corresponding to the phase difference.

For example, the amplitude of the pulse is determined according to the phase difference between the detected voltage, Vd, and the position confirmation current, im. As an example, the phase detector 420 includes a zero-crossing circuit to measure phases of the detected voltage, Vd, and the position confirmation current, im.

Figure 8:
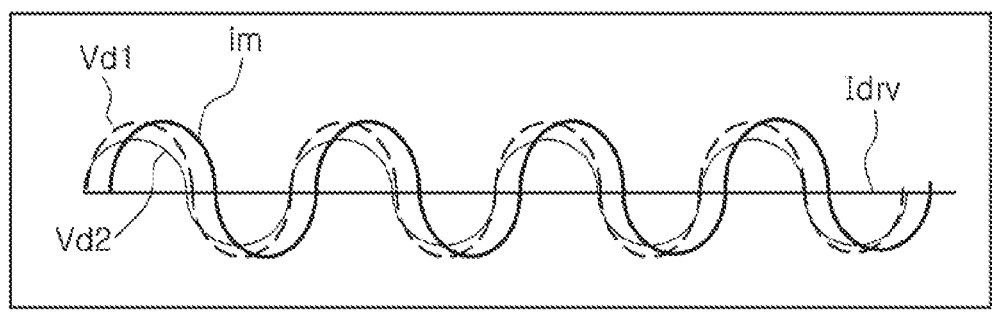
FIG. 8 is a schematic view of an overlapped driving signal, a position confirmation signal, a driving signal, a first detection signal, and a second detection signal, according to an example.

FIG. 8 is a schematic view of an overlapped driving signal, a position confirmation signal, a driving signal, a first detection signal, and a second detection signal, according to an example.

In FIG. 8, IDRV is an overlapped driving current corresponding to an overlapped driving signal, SDRV/im, is a position confirmation current corresponding to a position confirmation signal, Sm/Idrv, is a driving current corresponding to a driving signal, Sdrv, as well as Vd1 and Vd2 are a first detected voltage and a second detected voltage, respectively, corresponding to a detection signal, Sd, extracted from a signal extractor 300.

As set forth above, according to examples, a separate sensing unit such as a hall sensor is not used, such that manufacturing costs are reduced, space efficiency is improved, power consumption is reduced, and miniaturization of the apparatus to control a position of a camera module is possible.

In addition, sensing as well as driving is performed through one coil, and a closed loop position control is performed in a sensing scheme that does not have an influence on driving through one coil, such that position control is more stably and precisely performed.

Further, a defect element that may occur at the time of manufacturing the apparatus to control a position of a camera module and a process are simplified, such that an additional effect, as well as, a direct effect may be accomplished. In accordance with an example, the apparatus to control a position of a camera module does not include a separate sensor, such that the apparatus to control a position of a camera module is simply applied to an optical image stabilization (OIS) actuator or an optical zoom function, as well as, an autofocusing actuator.

The detectors, the magnetic members, the signal extractor, the driver in FIGS. 2, 3, and 7 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application.

The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus to control a position of a camera module, comprising:
    a magnetic member disposed on a lens barrel of the camera module;
    a coil disposed opposite to the magnetic member;
    a driver comprising an operational amplifier and a gain controller, and configured to generate an overlapped driving signal comprising a DC current driving signal and an AC current position confirmation signal, to which a gain from the gain controller has been applied, overlapped with each other, and to provide the overlapped driving signal to the coil, the position confirmation signal comprising a specific frequency component;
    a signal extractor configured to extract a detection signal, comprising the specific frequency component, from a signal of the coil; and
    a position detector configured to provide a position signal corresponding to a position of the magnetic member based on the detection signal.

2. The apparatus of claim 1, wherein the position detector is configured to detect impedance of the coil using the detection signal and the position confirmation signal, and configured to provide the position signal corresponding to the position of the magnetic member based on the impedance of the coil.

3. The apparatus of claim 1, wherein the detection signal is an AC voltage comprising the specific frequency component.

4. The apparatus of claim 1, wherein a frequency of the specific frequency component does not generate movement or resonance on the lens barrel.

5. The apparatus of claim 1, further comprising a controller configured to provide to the driver a feedback signal to control a position error based on the position signal from the position detector and a position reference signal.

6. The apparatus of claim 1, wherein the driver further comprises a switch and a resistance component.

7. An apparatus to control a position of a camera module, comprising:
    a magnetic member disposed on a lens barrel of the camera module;
    a coil disposed opposite to the magnetic member;

a driver comprising an operational amplifier and a gain controller, and configured to generate an overlapped driving signal comprising a DC current driving signal and an AC current position confirmation signal, to which a gain from the gain controller has been applied, overlapped with each other, and to provide the overlapped driving signal to the coil, the position confirmation signal comprising a specific frequency component;

a signal extractor configured to extract a detection signal, comprising the specific frequency component, from a signal of the coil; and a position detector configured to detect a magnitude of impedance of the coil using the detection signal and the position confirmation signal, and configured to provide a position signal corresponding to a position of the magnetic member based on a magnitude of the impedance of the coil.

8. The apparatus of claim 7, wherein the detection signal is an AC voltage comprising the specific frequency component.

9. An apparatus to control a position of a camera module, comprising:

a magnetic member disposed on a lens barrel of the camera module;

a coil disposed opposite to the magnetic member;

a driver comprising an operational amplifier and a gain controller, and configured to generate an overlapped driving signal comprising a DC current driving signal and an AC current position confirmation signal, to which a gain from the gain controller has been applied, overlapped with each other, and to provide the overlapped driving signal to the coil, the position confirmation signal comprising a specific frequency component;

a signal extractor configured to extract a detection signal, comprising the specific frequency component, from a signal of the coil; and a position detector configured to detect an angle of impedance of the coil using the detection signal and the position confirmation signal, and configured to provide a position signal corresponding to a position of the magnetic member, based on the angle of the impedance of the coil.

10. The apparatus of claim 9, wherein the detection signal is an AC voltage having the specific frequency component.

11. An apparatus for a camera module, comprising:

a magnetic member disposed on a lens barrel of the camera module opposite to a coil configured to drive the magnetic member;

a driver comprising an operational amplifier and a gain controller, and configured to generate an overlapped driving signal comprising a DC current driving signal and an AC current position confirmation signal, to which a gain from the gain controller has been applied, overlapped with each other, and to provide the overlapped driving signal to the coil, the position confirmation signal comprising a specific frequency component;

a signal extractor configured to extract a detected voltage, comprising the specific frequency component, from a voltage across the coil and output a detection signal indicative thereof; and a position detector configured to calculate a magnitude and an angle of impedance of the coil using the detection signal and the position confirmation signal to detect a position of the lens barrel and output a position signal indicative thereof.

12. The apparatus of claim 11, wherein the driver generates the position confirmation signal independently of the driving signal.

13. The apparatus of claim 11, wherein the position detector is configured to calculate the impedance of the coil using a ratio between the detection signal and the position confirmation signal where the detection signal is a detected voltage and the position confirmation signal is a position confirmation current.

14. An apparatus for a camera module, comprising:

a coil mounted on a side of a housing of a camera module, opposite to a magnetic member to provide a driving force to the magnetic member;

a driver comprising an operational amplifier and a gain controller, and configured to generate and provide to the coil an overlapped driving signal comprising an AC current position confirmation signal, to which a gain from the gain controller has been applied, overlapped with a DC current driving signal;

a signal extractor configured to extract a detected voltage from a voltage across the coil and output a detection signal indicative thereof, wherein the detection signal comprises a specific frequency component; and a position detector configured to detect impedance of the coil using the detection signal and the position confirmation signal and generate a position signal corresponding to a position of the magnetic member, based on the impedance of the coil.

15. The apparatus of claim 14, wherein the driver comprises a full bridge circuit bidirectionally driven.

16. The apparatus of claim 14, wherein a magnitude of the position confirmation signal is smaller than a magnitude of the driving signal.

* * * * *